Feb. 17, 1953  G. W. STIEHM  2,628,914
FOOD PACKAGE HAVING INSERTABLE FOOD ARTICLE SUPPORT
Filed Aug. 24, 1951  4 Sheets-Sheet 1
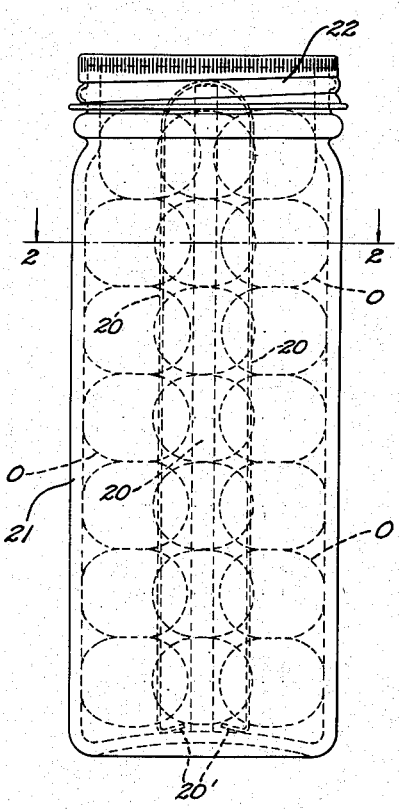
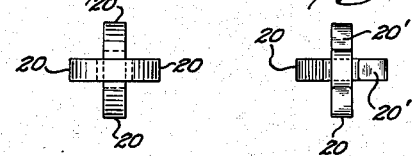
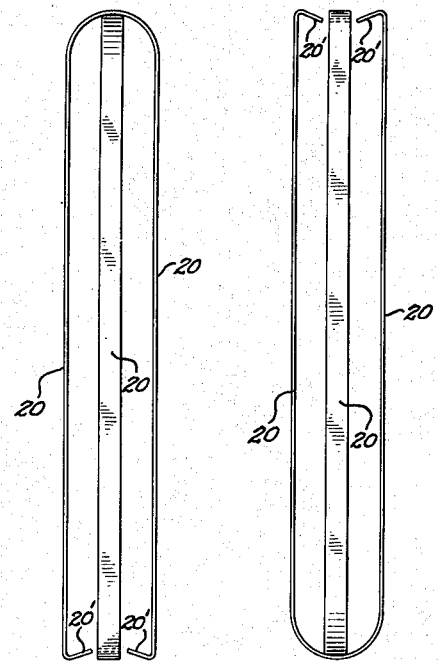
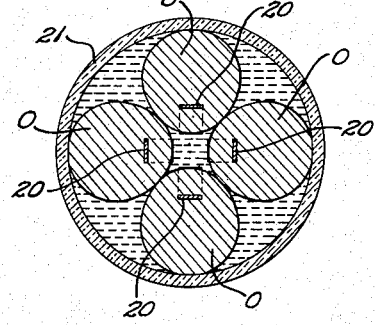
INVENTOR.
Glen W. Stiehm,
BY Morsell & Morsell
ATTORNEYS.

Feb. 17, 1953 — G. W. STIEHM — 2,628,914
FOOD PACKAGE HAVING INSERTABLE FOOD ARTICLE SUPPORT
Filed Aug. 24, 1951 — 4 Sheets-Sheet 2

INVENTOR.
Glen W. Stiehm,
BY
Morsell & Morsell
ATTORNEYS.

Feb. 17, 1953 G. W. STIEHM 2,628,914
FOOD PACKAGE HAVING INSERTABLE FOOD ARTICLE SUPPORT
Filed Aug. 24, 1951 4 Sheets-Sheet 3
Fig. 11.
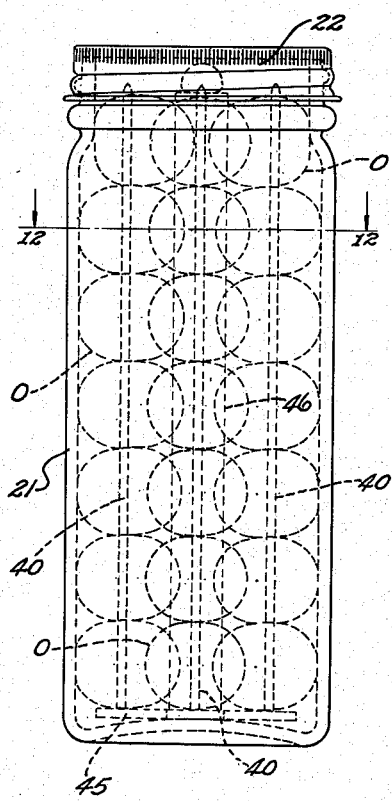
Fig. 14.
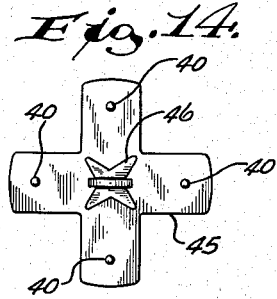
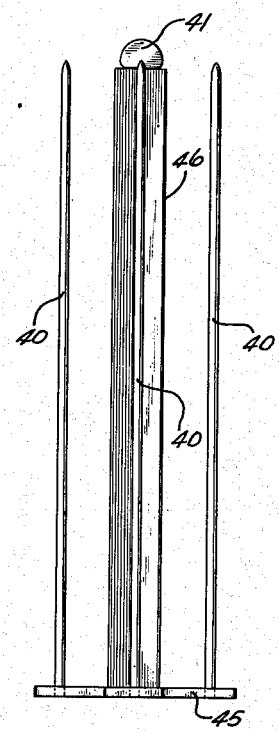
Fig. 12.
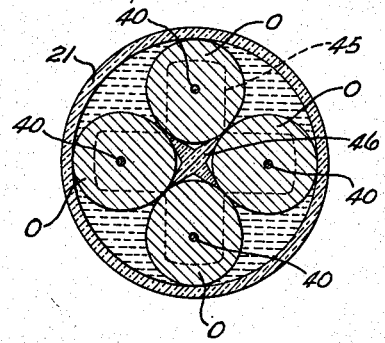
Fig. 13.
INVENTOR.
Glen W. Stiehm,
BY Morsell & Morsell
ATTORNEYS Feb. 17, 1953 G. W. STIEHM 2,628,914
FOOD PACKAGE HAVING INSERTABLE FOOD ARTICLE SUPPORT
Filed Aug. 24, 1951 4 Sheets-Sheet 4

INVENTOR.
Glen W. Stiehm,
BY
Morsell & Morsell
ATTORNEYS.

Patented Feb. 17, 1953

2,628,914

UNITED STATES PATENT OFFICE 2,628,914

FOOD PACKAGE HAVING INSERTABLE
FOOD ARTICLE SUPPORT

Glen W. Stiehm, Milwaukee, Wis., assignor to
Jewett & Sherman Company, Milwaukee, Wis.,
a corporation of Wisconsin Application August 24, 1951, Serial No. 243,545

7 Claims. (Cl. 99—186)

This invention relates to improvements in food package having insertable food article support, and more particularly to impaling means for facilitating the packing in containers of relatively uniform food products such as olives, cherries, pickles and the like.

Certain food items, as for example olives, are packed for retailing in brine filled jars or bottles. Each bottle or jar of a given size should contain a predetermined number of the food articles being packed, and in the case of such items as olives, cherries, pickles and the like, the jars are hand packed which is slow and laborious and therefore relatively expensive. Also in containers packed with food items as above mentioned, the ultimate consumer finds it rather difficult to dislodge and remove the uppermost items from the packed container because of the tight manner in which the articles are initially packed in the container.

With the above in mind it is, therefore, a primary object of the present invention to provide an instrumentality adapted to have individual, relatively uniform, food articles impaled thereon in a stacked relationship whereupon the instrumentality with the impaled food items thereon may be easily and quickly inserted into a brine or liquor filled container, longitudinally thereof, whereby a predetermined number of food items are compactly and conveniently housed within the container which is then provided with a cap or cover, which when subsequently removed by the consumer permits full or partial removal of the impaling instrumentality from the container for access to any number of the food items impaled on said instrumentality.

A further object of the invention is to provide a food packing device of the character described which is easily removed from the container housing the same, when the container is open, permitting the removal of a desired number of the impaled food items, whereupon the impaling instrumentality with the remainder of the food items thereon may be reconfined within the container and submerged in the liquor or brine therein.

A further object of the invention is to provide a food packing device which houses relatively uniform food items in a container in an attractive orderly manner.

A further object of the invention is to provide a food packing device which securely holds the food items packed thereon within a container in a manner to prevent dislodgement of the food items, which is inexpensive to manufacture and use, which greatly facilitates the tight and accurate packing of food items such as olives in containers, which is distinctive and attractive in appearance, and which is well adapted for the purposes set forth.

With the above and other objects in view the invention consists of the improved food packing device, and its parts and combinations as set forth in the claims, and all equivalents thereof.

In the accompanying drawings in which the same reference characters indicate the same parts in all of the views:

Fig. 1 is a side view of a cylindrical glass container housing one form of the improved food packing device having food products such as olives impaled thereon;

Fig. 2 is a horizontal sectional view taken on line 2—2 of Fig. 1;

Fig. 3 is a side view of the improved food packing device of the form shown in Fig. 1 removed from the container;

Fig. 4 is a top view thereof;

Fig. 5 is a side view of a food packing device removed from its container, similar to the device of Fig. 3 only adapted to be used in the container in an inverted position;

Fig. 6 is a top view of the device shown in Fig. 5;

Fig. 11 is a side view of a cylindrical glass container housing another modified form of food item impaler with the latter having olives or the like impaled thereon;

Fig. 12 is a horizontal sectional view taken on line 12—12 of Fig. 11;

Fig. 13 is a side view of the food impaling device of Fig. 11 removed from the container;

Fig. 14 is a plan view of the device shown in Fig. 13;

Figure 7:
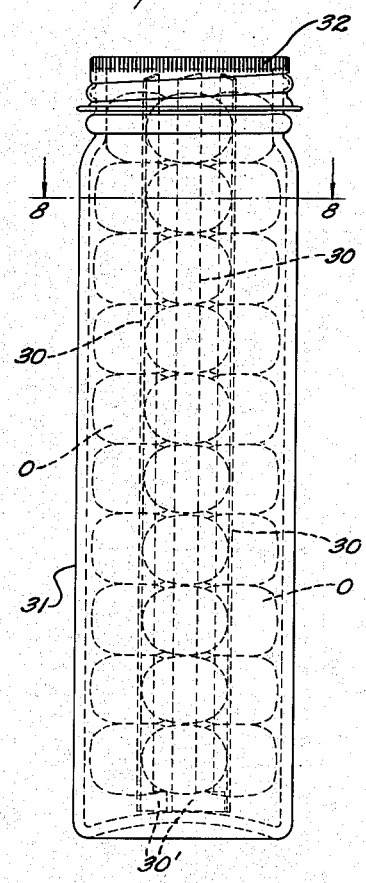
Fig. 7 is a side view of a cylindrical glass container housing still another modified form of food packing device with olives impaled thereon.
Figure 9:
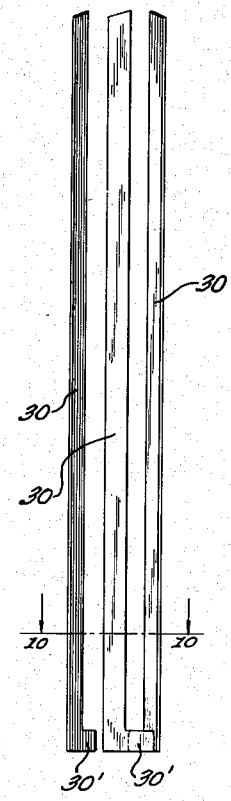
Fig. 9 is a side view of the food item impalers of Fig. 7 removed from the container.
Figure 8:
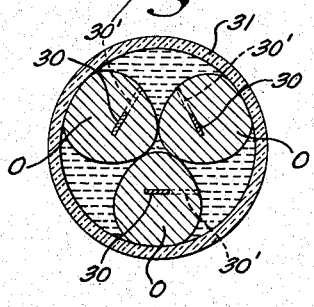
Fig. 8 is a horizontal sectional view taken on line 8—8 of Fig. 7.
Figure 10:
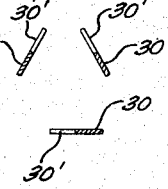
Fig. 10 is a horizontal sectional view taken on line 10—10 of Fig. 9.

While the improved food packing device is susceptible of use in connection with the packing of various types of food products of relatively small and uniform size and shape, it finds particular utility in connection with the packing of olives in cylindrical jars or containers. Therefore, although the various forms of packing devices may be described in connection with the impalement of olives, this is merely by way of example and the invention is not to be restricted to devices adapted solely for the packing of olives, but is intended to be used for various types of relatively small, uniform food products.

In the form of the invention shown in Figs. 1 to 4 inclusive the food item impaler, shown in detail in Fig. 3, is in the form of a pair of inverted U-shaped elements crossing each other at right angles at their closed upper ends, providing elongated, depending relatively thin impaling arms 20. The crossed U-shaped impaling members are preferably formed of a bendable plastic and initially the lower free ends of the impaling arms 20, which may be sharp and slightly pointed to facilitate the piercing of items, are rectilinearly directed. When the food packing device of Fig. 3 is to be used in the packing of such food products as olives, for instance, each of the arms 20 has olives threaded thereonto in a stacked or superimposed relationship. Thereupon the lower ends of the arms 20 are then bent angularly to form feet 20' which serve to prevent undesired removal of the impaled food items.

The numeral 21 indicates a relatively wide mouth cylindrical bottle or jar of a proper size to receive the food packing device of Fig. 3 in its loaded condition, the container 21 being of slightly greater height than the length of the packing device of Fig. 3. If the container 21 is to house impaled olives O, it contains a suitable quantity of brine or liquor and the loaded device is then inserted into the container 21 through the open upper end thereof, occupying a central zone within the cylindrical container with the olives O projecting radially into adjacency with respect to the inner wall of the container. When a cap or cover 22 is applied to the container 21 the same is ready for storage or shipment.

When the consumer wishes to use any of the food items in the packed container 21, it is merely necessary for him to remove the cap 22 and grasp the contacting closed ends of the inverted U-shaped members raising both members out of the container. Then, if the lower ends 20' of the arms are temporarily straightened any number of impaled olives or food items may be removed from one or more of the arms 20. The food packing device, after the desired number of items have been removed for immediate use, is then reinserted into the container and is maintained in this condition until it is desired to remove additional olives from the container and packing device.

In Figs. 5 and 6 the food packing device is the same as that shown in Fig. 3 except the U-shaped members are inverted relative to the Fig. 3 showing so that their crossing closed ends are at the bottom of the unit. The food packing device of Fig. 5, when food items such as olives are impaled on the arms 20, is inserted into the container 21 in the manner shown in Fig. 1 except that the device has its closed end at the bottom of the container. If it is desired to remove a few olives from the impaling arms 20, it is only necessary to lift the upper end of the device out of the container and temporarily straighten the arm extensions 20' to permit a selected number of olives or the like to be slid upwardly off of the arms. Thereupon the device can be resubmerged in the brine and completely confined in the container 21.

A modified form of the invention is disclosed in Figs. 7 to 10 inclusive wherein the food packing device takes the form of a selected number of independent rectilinear impaling arms 30 whose lower ends are preferably formed with angularly directed extensions 30' for the purpose of preventing impaled food items from slipping off of the lower ends of the arms 30.

Each of the independent rectilinear arms 30 may have impaled thereon by piercing, a superimposed stack of food items such as olives O. For a cylindrical container 31 of the type shown in Figs. 7 and 8 it has been found that three of the loaded members 30, suitably separated, may be longitudinally disposed within the cylindrical container 31 to pack the same in the manner illustrated. It is obvious that when a consumer wishes to obtain access to one or more impaled food items the cap 32 of the container is removed, whereupon the upper ends of the impaling arms 30 are accessible and one or more of the same may be raised out of the container to afford access to any desired number of impaled olives which are removed by being slid off of the upper ends of the arms 30. Subsequently said arms with the remaining food items thereon are dropped back into the brine filled container 31 to pack and preserve the items for use at a future time.

Still another modified form of food packing device is illustrated in Figs. 11 to 14 inclusive. As best shown in Figs. 13 and 14, this form of food packing device comprises a flat base 45 from the center of which rises a stem 46 having four opposite sides thereof slightly dished (see Figs. 12 and 13) for a purpose hereinafter to be set forth. Surrounding the central stem 46 and separated from one another by ninety degree angles are four impaling rods 40 having their lower ends supported in outwardly projecting portions of the base 45.

This form of food packing device is adapted to have each rod 40 loaded with food items such as olives, with the latter being impaled thereon and inserted onto the rods 40 from the free upper ends thereof, which are slightly pointed. The device of Fig. 13 when loaded with olives or other food items may then be housed within a cylindrical container 21 in the manner shown in Fig. 11 with the open upper end of the container being normally closed by a cap 22. When it is desired to remove any of the impaled food items O, the container cap 22 is removed and then the device is lifted upwardly a desired extent out of the container by manually grasping a tab 41 formed on the upper end of the central post 46. As will be observed from Fig. 12 the dished sides of the central stem 46 serve to locate and engage inner sides of the food items O on each of the impaling rods 40.

Figure 15:
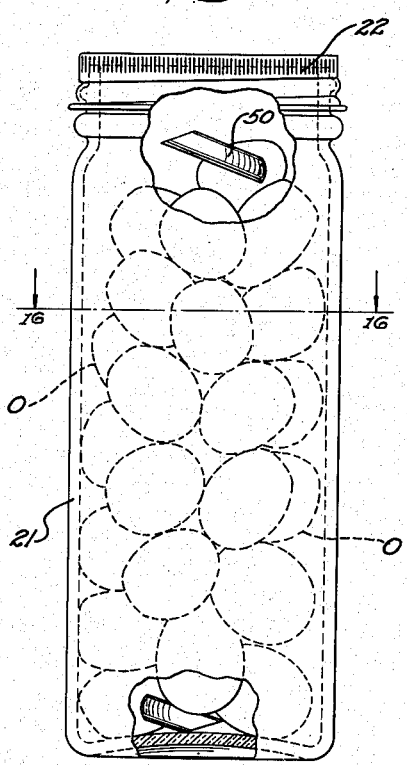
Fig. 15 is a side view of a cylindrical glass container housing still another alternative form of food impaling device with olives or the like impaled thereon.
Figure 17:
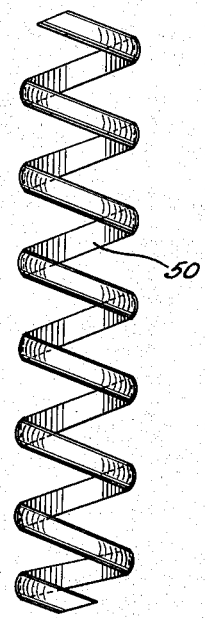
Fig. 17 is a side view of the food article impaler of the form shown in Fig. 15 devoid of impaled food items and removed from the container.
Figure 16:
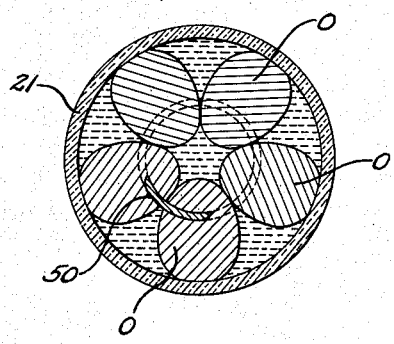
Fig. 16 is a horizontal sectional view taken on lines 16—16 of Fig. 15.

The form of food packing device shown in Figs. 15, 16 and 17 is an impaler in the form of a coil 50. This member 50 may have its opposite ends slightly pointed and is of a diameter substantially less than that of the container 21 which is to ultimately house the loaded impaling coil 50. Food items such as olives O are inserted onto the member 50 and the same form a spirally trending string of impaled items. When the coil 50 with food products O impaled thereon in spiral form is housed within a cylindrical container 21, the packed condition illustrated in Fig. 15 attains. For the removal of any of the packed food items O, when the cap 22 of the container 21 is removed, the upper end of the impaling coil 50 may be grasped so as to partially or completely lift the packed device out of the container 21. Thereupon any desired number of food items O may be slid from either end of the coil 50.

In all of the forms of the improved food packing device illustrated and described the device may be formed of any suitable material, but plastic has been found to be very satisfactory as it can be shaped and it is not susceptible of deterioration through prolonged submergence in a preserving brine or fluid. The elongated elements on which the olives or other food products are impaled in stacked relationship are of limited thickness so that the same may easily pierce the food items to be packed. Through utilization of any of the forms of the improved food packing devices a cylindrical container of the proper size will be fully packed and the food items will be maintained therein in a neat and orderly fashion. Also the packer may be sure of having a predetermined number of products in a container of a given size or capacity.

In the forms of food packing devices disclosed in Figs. 1 to 14 inclusive, when the container is packed there are horizontal layers of packed food items wherein the articles in each layer contact one another and also contact the articles in layers thereabove and therebelow, and furthermore are closely adjacent the inner wall of the container, whereby the food products are prevented from undesired shifting or displacement during shipment, and all of the space within the container is efficiently made use of. With respect to the form of the invention shown in Figs. 15 to 17, due to the spiral relationship of the impaled olives, there are not true horizontal layers but there is nevertheless mutual contact between adjacent olives and between olives or food articles both above and below a particular olive. In all forms of the invention the food packing device for a given container is removably housed within a cylindrical zone within the container of less diameter than that of the container. All forms of the invention permit easy full or partial removal of a device from a container to give access to any desired number of impaled food articles, and removal of an impaling device and reinsertion of the same into the container is accomplished quickly and easily and without bruising or damaging any of the packed food articles.

The improved food packing device is not only simple to construct and use but greatly facilitates the packing of cylindrical containers with a given number of articles such as olives, is unique and attractive in appearance, and is well adapted for the purposes described.

What is claimed as the invention is:

1. The combination with a cylindrical container, of a food article impaler removably housed entirely within a cylindrical zone therewithin of substantially less diameter than that of the container, said impaler consisting of an elongated thin rectilinear strip member positioned parallel to the axis of the container, and a plurality of similar food articles impaled thereon in stacked relationship throughout its length and axially of the container with said impaled food articles projecting beyond the elongated member into adjacency with the inner wall of the container, the impalement of the food articles together with their contact with adjacent impaled food articles and their confinement within the container serving to hold the food articles snugly against undesired shifting and displacement.

2. The combination with a cylindrical container, of a plurality of elongated food article impalers removably housed in angularly spaced-apart relationship entirely within a cylindrical zone within said container of substantially less diameter than that of the container, each impaler consisting of an elongated thin strip member, and similar food articles impaled on each impaler in stacked relationship throughout its length with said impaled food articles projecting beyond the elongated member into adjacency with the inner wall of the container, the impalement of the food articles together with their contact with adjacent impaled food articles on the same and adjacent impalers serving to hold the food articles snugly against undesired shifting and displacement.

3. An impaler for packing relative uniform and similar globular food articles, comprising a pair of elongated, U-shaped members having their closed ends cross each other at right angles, said members being adapted to be removably, longitudinally disposed within a cylindrical container and the elongated side arms of said U-shaped members having ends for insertion into and removal from globular food articles with each of said side arms being adapted to have a plurality of such food articles impaled thereon throughout their lengths in a stacked, contacting relationship.

4. The combination with a cylindrical container, of a food article impaler removably housed entirely within a cylindrical zone therewithin of substantially less diameter than that of the container, said impaler consisting of a pair of U-shaped members each of which has elongated thin side arms adapted to have similar food articles impaled thereon in stacked relationship throughout their lengths with said impaled food articles projecting beyond said side arms into adjacency with the inner wall of the container, the impalement of the food articles together with their contact with adjacent impaled food articles and their confinement within the container serving to hold the food articles snugly against undesired shifting and displacement, said U-shaped members being arranged with their closed ends crossing each other at right angles.

5. Means for packing relatively uniform and similar globular food articles within a cylindrical container, comprising a plurality of elongated narrow, band-like members adapted to be removably longitudinally disposed within a cylindrical container in spaced-apart relation, each elongated member having a free end for insertion into and removal from globular food articles with each elongated member being adapted to have a plurality of such food articles impaled thereon throughout the length of said member in a stacked, contacting relationship and in a contacting relationship relative to adjacent impaled food articles on the adjacent elongated members.

6. The combination with a relatively wide mouth cylindrical container, of a plurality of elongated narrow impaling members removably disposed within said container longitudinally thereof, said impaling members being spaced from one another in parallel relationship axially of the container and each carrying by impalement a stack of relatively uniform olives.

7. The combination with a wide-mouth container, of a plurality of spaced-apart parallel elongated members longitudinally removably housed within said container, each of said elongated members having a free end and having a plurality of relatively uniform food articles impaled thereon theroughout the length of said member in a stacked relationship, said food articles being insertable onto and removable from the elongated members via the free ends thereof, the food articles on an elongated member being in contact with food articles on adjacent elongated members and in close adjacency to the container wall, the mutual contact of the food articles on adjacent elongated members and their proximity to the container wall serving to hold said articles snugly against unauthorized shifting and displacement, said elongated members with the food articles thereon being removable from the container to afford access to or removal of selected food articles.

GLEN W. STIEHM.

REFERENCES CITED

The following references are of record in the file of this patent:

UNITED STATES PATENTS

| Number | Name | Date |
| --- | --- | --- |
| 951,500 | French | Mar. 8, 1910 |
| 1,116,172 | Turner | Nov. 3, 1914 |
| 1,190,152 | Gross | July 4, 1916 |
| 1,519,738 | McGowan | Dec. 16, 1924 |

OTHER REFERENCES

"Olive-Packing Mechanized," Food Engineering, July 1, 1950.